United States Patent [19]

Haeussermann et al.

[11] Patent Number: 4,733,356
[45] Date of Patent: Mar. 22, 1988

[54] CONTROL DEVICE FOR A VEHICLE ROUTE GUIDANCE SYSTEM

[75] Inventors: Peter Haeussermann, Backnang; Ferdinand Panik, Fellbach; Hermann Gaus, Stuttgart; Gerhard Druecker, Neuhausen, all of Fed. Rep. of Germany

[73] Assignee: Daimler-Benz Aktiengesellschaft, Stuttgart, Fed. Rep. of Germany

[21] Appl. No.: 808,478

[22] Filed: Dec. 13, 1985

[30] Foreign Application Priority Data

Dec. 14, 1984 [DE] Fed. Rep. of Germany ....... 3445668

[51] Int. Cl.$^4$ .............................................. G06F 15/50
[52] U.S. Cl. ..................... 364/424; 364/443; 340/988
[58] Field of Search ............... 364/424, 443, 444, 449, 364/551; 377/20; 342/450, 451; 73/178 R; 340/988, 990, 995

[56] References Cited

U.S. PATENT DOCUMENTS

| 3,845,289 | 10/1974 | French | 364/444 |
| 4,338,512 | 7/1982 | Ludwig | 377/20 |
| 4,376,298 | 3/1983 | Sokol et al. | 364/424 |
| 4,514,810 | 4/1985 | Ito et al. | 364/449 |
| 4,551,801 | 11/1985 | Sokol | 364/551 |
| 4,570,227 | 2/1986 | Tachi et al. | 364/424 |

OTHER PUBLICATIONS

SAE Technical Paper No. 840485, "On-Board Computer System for Navigation, Orientation and Route Optimization," 1984.
"ntz", vol. 36 (1983), Issue 4, pp. 214-218.

Primary Examiner—Gary Chin
Attorney, Agent, or Firm—Barnes & Thornburg

[57] ABSTRACT

A control device of a component vehicle route guidance system, the system comprising an on-board section having a navigation computer, and a vehicle-installed display for indicating the driver information data of the system. The control device is constructed as a portable hand-operated unit including a route computer, operating means and its own display, allowing the preselection of the route functions to be performed outside the vehicle. The device interfaces with the guidance system by plugging it into the on-board section in the vehicle. Various functions are enabled depending on which position the control device occupies in the on-board section.

18 Claims, 6 Drawing Figures

CONTROL DEVICE FOR A VEHICLE ROUTE GUIDANCE SYSTEM

BACKGROUND AND SUMMARY OF THE INVENTION

The invention relates to a control device of a component vehicle route guidance system.

In a known vehicle route guidance system (SAE Technical Paper Series No. 840 485) both the navigation computer and the route computer are permanently installed in the instrument area of the vehicle. The control device for the individual functional components of the route guidance system includes a key panel installed in the instrument panel for operating the system, and a display which is also permanently installed in the vehicle for indicating driver information data. A disadvantage of this route guidance system is that the user can operate this system by the control device only if he is located in the vehicle. Further disadvantages are the relatively large installation space on the instrument panel that the control device occupies and the fact that operating errors are not excluded due to the continuous accessibility of the key panel.

An objective of the present invention is to provide a control device of a vehicle route guidance system, while retaining the clear vehicle display, in such a manner that it is more universally applicable, takes into account the crowded installation conditions in the vehicle, eliminates distractions of the driver and operating errors by the driver as much as possible, yet does not result in increased costs.

The objectives are attained by providing a control device which includes an integrated route computer, a first operating means for operating the route computer, and a display for indicating the driver information data of the system, and by making the device operable separately from the vehicle and connectable to the vehicle through an interface by a plug-in technique.

Due to the fact that the control device is constructed as a portable hand-operated unit with its own display and operating facilities and with an integrated route computer, it can be operated completely independent of the vehicle with respect to route programming. Thus, preparations for a trip can also be made, for example, at one's desk. Providing the hand-opeated unit with an independent display does not cause excessive additional costs since, compared with the vehicle display, the character size can be kept smaller, the contrast a little lower and the reading angle clarly smaller. In addition, the control device display does not need to be operable over the complete range of motor vehicle temperatures but needs to agree with the vehicle display only within the range of storage temperatures. Because the control device can be connected to the vehicle by plug-in techniques, the crowded installation conditions in the vehicle are taken into account since the space required for a larger key panel does not need to be provided in the vehicle. Further, distractions of the driver and operating errors by the driver are both eliminated to the greatest extent possible by the plug-in technique and the division of the operating means into a first and second operating means. Only the second operating means, which controls the operations during the trip, is still accessible during the trip. However, this second operating means only comprises a few keys or buttons.

Further objects, features, and advantages of the present invention will become more apparent from the following description when taken with the accompanying drawings, which show for purposes of illustration only, an embodiment constructed in accordance with the present invention.

DESCRIPTION OF THE DRAWINGS

FIG. 1b is an end view of the embodiment of FIG. 1a;

FIG. 3 is a block diagram of the embodiment of FIG. 1a; and

DETAILED DESCRIPTION OF THE DRAWINGS

Figure 1A:
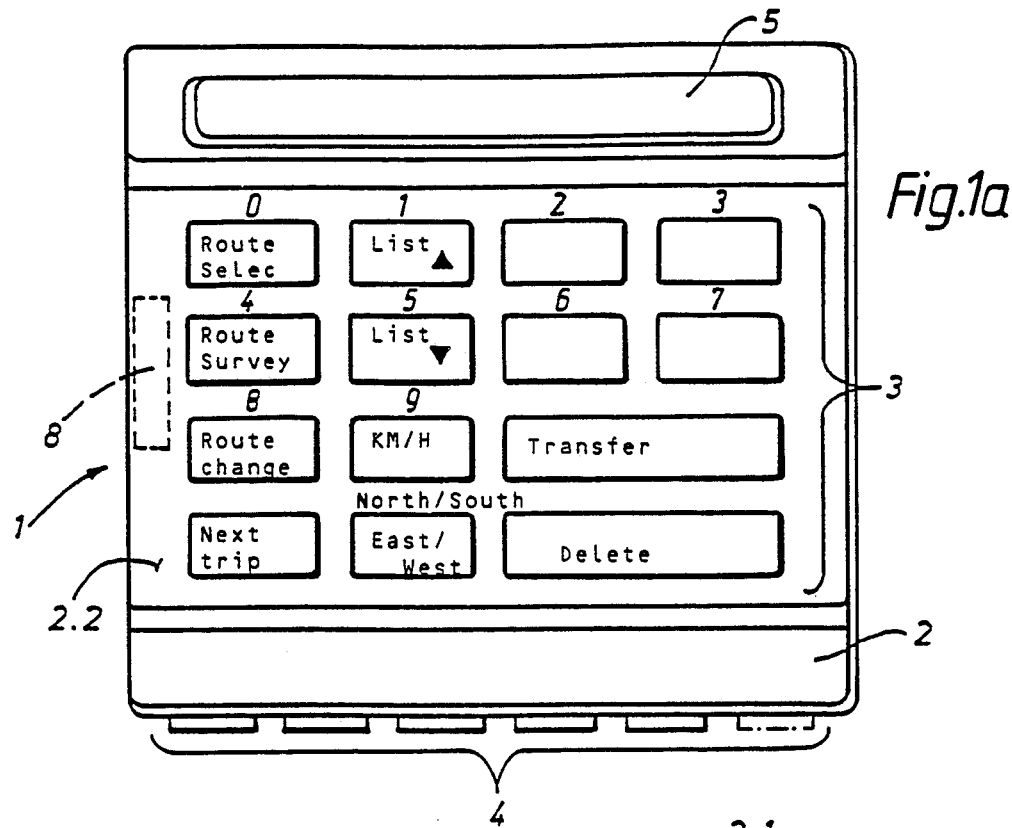
FIG. 1a is a plan view of a preferred embodiment of the present invention.
Figure 1B:
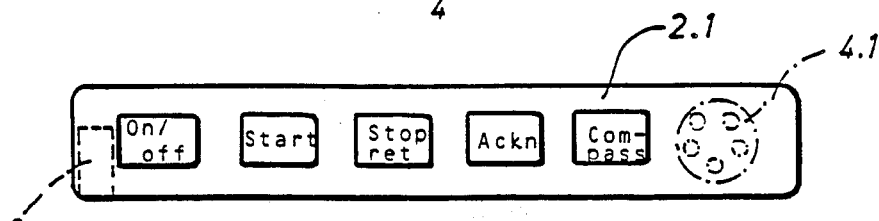

As can be seen from the FIGS. 1a, 1b, 2a, 2b, the control device 1 consists of a portable, rectangular-shaped hand-operated unit 2 comprising operating facilities 3 and 4 and a display 5. The hand-operated unit 2 contains the complete route computer for route optimization and automatic route indication, and a stored road network. The route computer is in the form of a microcomputer system which, as shown in FIG. 3, is comprised of the central processing unit 1.1, the read-only memory 1.2, the read/write memory 1.3, the input unit 1.4 comprising the operating facilities 3 and 4, the indicating unit 1.5 containing the display 5 and the switching sections 1.6 which contain sensors for detecting the plugged-in positions of the hand-operated unit. In addition the hand-operated unit 2 also contains a plug-in compartment 8 into which a road network memory chip can be inserted and can be connected to the route computer, in which arrangement the road network can be simply changed by exchanging a memory chip.

Figure 4:
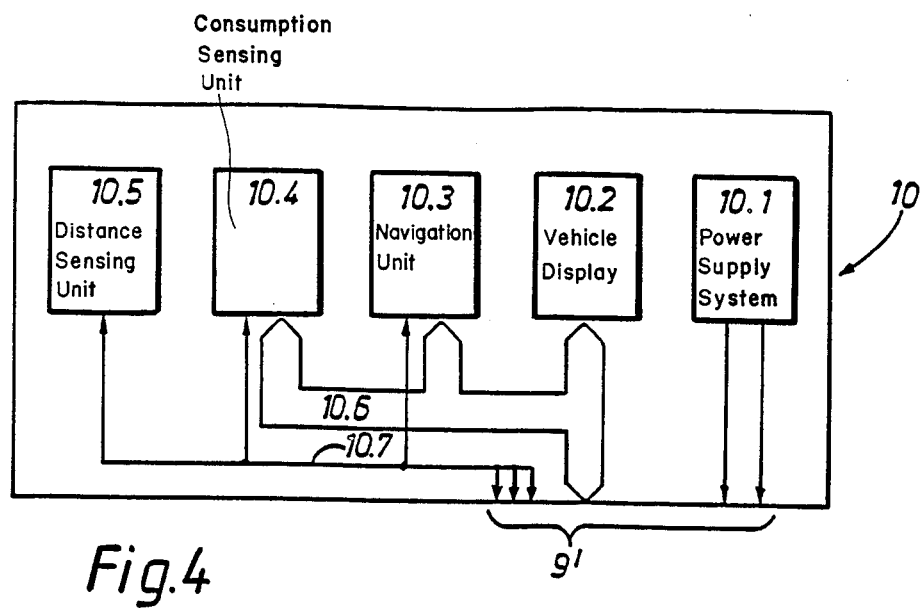
FIG. 4 is a block diagram of the on-board section of the vehicle route guidance system.

To operate the route guidance system in the vehicle, the hand-operated unit 2 is plugged into a plug-in compartment 6 of the instrument panel 7 of the vehicle, thereby connecting the interface plug 9 of the hand-operating unit to the interface coupling 9' of the on-board section 10. The on-board section 10, as shown in FIG. 4, includes a connection to the on-board power supply system 10.1 of the vehicle, a vehicle display 10.2, a navigation unit 10.3, a consumption sensing unit 10.4, a distance sensing unit 10.5, a corresponding bus system 10.6 and control lines 10.7. The operation of the on-board section 10 is controlled by the central processing unit 1.1 in response to signals from switching sections 1.6.

As shown in FIG. 3, all units of the hand-operated unit 2 are connected to each other via the bus system 1.7. An interface converter 1.8 converts the parallel information of the bus system 1.7 into the serial information of the bus system 10.6 of the on-board section 10. The control device central processing unit 1.1 uses the control lines 10.7 to request data from the on-board section 10 and receives the data via the buses 10.6 and 1.7.

A rechargeable battery 1.9 is used for supplying the hand-operated unit 2 with power when it is separated from the on-board section 10. However, when the hand-operated unit 2 is plugged into the on-board section 10, it is supplied with power by the on-board power supply system 10.1 of the vehicle.

The functions of the route guidance system can be divided into functions "before the start of the trip" and into functions which are actuated "during the trip". Pre-trip functions are: input of origin and destination (up to nine routes can be entered at one time), calculation of the optimum route, checking and possible adaptation of the calculated route to the traffic conditions or personal requirements and preselecting the route on which automatic route indication is to be carried out. These functions are independent of the vehicle and can therefore be performed with the hand-operated unit 2 outside the vehicle. Functions during the trip are: starting the automatic route indication at the position entered, stopping of this function, fine correction of any measurement errors, and special functions. Accordingly, the hand-operated unit 2 is divided into three fields: into display 5, operating facility 3 for the pre-trip functions and operating facility 4 for the functions during the trip.

Figure 2A:
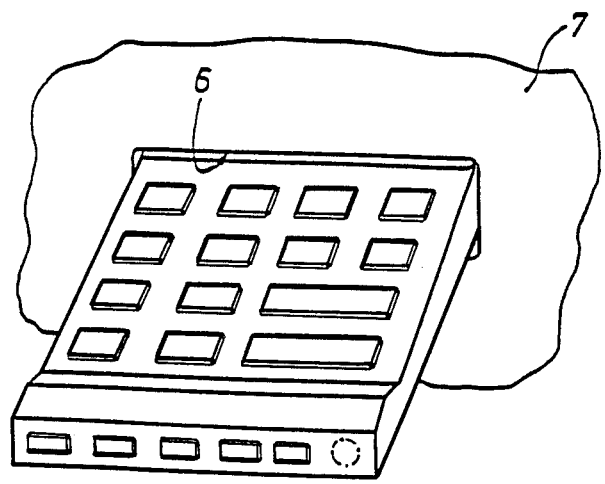
FIG. 2a is a schematic perspective view showing the embodiment of FIG. 1a in a first plugged-in position in the plug-in compartment of the vehicle.
Figure 2B:
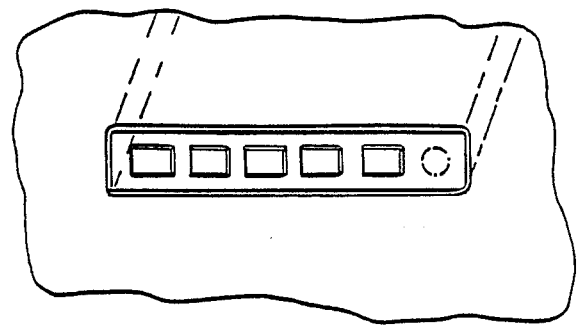
FIG. 2b is a schematic perspective view showing the embodiment of FIG. 1a in a second plugged-in position in the plug-in compartment of the vehicle.
Figure 3:
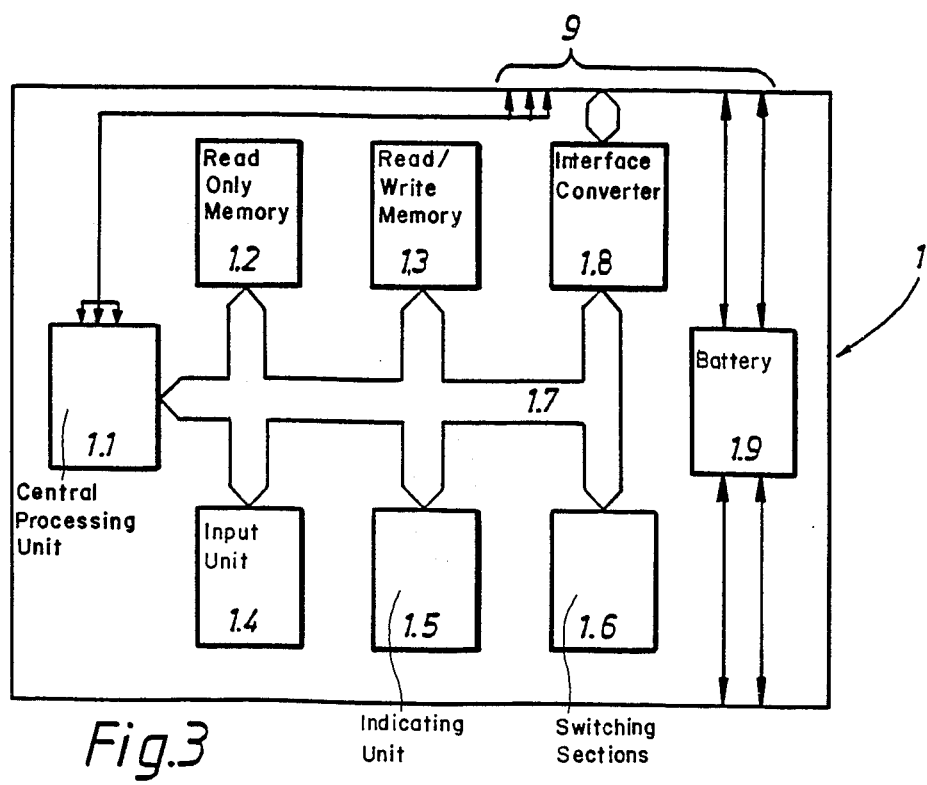

The hand-operated unit 2 can be plugged into the on-board section 10 in two plugged-in positions. This results in a total of three operating modes:

(1) operation of the hand-operated unit outside the vehicle;

(2) operation of the hand-operated unit in the vehicle in the first plugged-in position (FIG. 2a); and (3) operation of the hand-operated unit in the vehicle in the second plugged-in position (FIG. 2b).

In the operating mode outside the vehicle, all functions of the "pre-trip" group can be enabled with the operating facility 3. At the same time, the functions 4 for "during the trip" are disabled. The driver information data are displayed by the display 5 of the hand-operated unit 2.

In the first plugged-in position operating mode, the hand-operated unit 2 is plugged into the plug-in compartment 6 so that the display 5 of the hand-operated unit 2 is no longer visible. To indicate the driver information data, an automatic switch-over to the display 10.2 of the vehicle occurs. The "pre-trip" functions are still operated by the operating facility 3 and the "during the trip" functions remain disabled. In this first plugged-in position, a final input or current correction on the calculated route can still be entered.

In the second plugged-in position operating mode, the hand-operated unit 2 is plugged into the plug-in compartment 6 so that only the operating facility 4 for the functions "during the trip" remains visible and operable. In second plugged-in-position, an automatic switch-over to the automatic route guidance mode of the operation occurs but the automatic route guidance is not yet started.

The number of keys of the operating facility 4 for the functions "during the trip" are kept as low as possible so that this group of keys can be advantageously arranged at the front face 2.1 of the hand-operated unit 2.

This low number of keys can be achieved due to the fact that certain functions are enabled when the hand-operated unit 2 is moved from the first plugged-in position to the second plugged-in position. Thus, in the second plugged-in position, a preselected route—which follows the first route as "next trip"—entered into the route computer is automatically stored in the on-board section 10 and is thus available for automatic route indication. Similarly, the starting point of the route contained in the route memory of the route computer is automatically indicated in the vehicle display 10.2. If the route memory does not yet contain a route, a request indication for route input will automatically appear on the vehicle display 10.2 in the first and second plugged-in positions.

A further preferred embodiment of the hand-operated unit 2 completely dispenses with operating keys in the second plugged-in position. The few operating interventions necessary are then carried out through a speech input connection 4.1, as shown in phantom in FIG. 1b.

In a preferred embodiment, the control device display is a 1-line LC display and the vehicle display is a 2-line transflective LC display.

The advantages of the control device according to the invention are that space does not need to be provided in the vehicle for a large key panel; that preparation for the trip can be carried out outside the vehicle; unnecessary operating processes during the trip in the second plugged-in position are prevented; and operating errors and distractions of the driver are minimized by the low number of accessible keys.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A control device of a multiple component vehicle route guidance system comprising a vehicle-installed on-board section having a navigation computer and a vehicle-installed display for indicating the driver information data of the system, and the control device, which includes:

second operating means for inputting operation commands to said on-board section, said second operating means being operable only when said control device is in said second plugged-in position.

switching means for enabling and disabling various functions of said route guidance system, wherein in said second plugged-in position, said switching means disables said first operating means, and enables said second operating means to operate said on-board section; causes driver information data to be indicated only on said vehicle display; and causes automatic integrated route computer means for computing a vehicle route, first operating means for inputting operation commands to said integrated route computer means, a control device display connected to said route computer means for indicating driver information data, interface means for allowing said control device to operate independent of said vehicle or attached by being plugged in to said on-board section of said vehicle, sensor means for detecting a first or second plugged-in position of said control device, wherein in said first plugged-in position, said first operating means is able to input operation commands to said integrated route computer means, and said driver information data is displayed on said vehicle-installed display, and route guidance mode of operation of the system to be automatically switched over to said on-board section.

2. Control device according to claim 1, wherein the second operating means is a speech-input means for inputting operation commands during the trip.

3. Control device according to claim 1, wherein the second operating means is arranged at the face opposite to a plug-in face of the control device.

4. Control device according to claim 1, wherein the second operating means is a key panel for inputting operation commands during the trip.

5. Control device according to claim 2, wherein in the second plugged-in position, said switching means automatically transfers a preselected route entered into the route computer in said control device to said on-board section.

6. Control device according to claim 1, wherein in the second plugged-in position, said switching means automatically causes the starting point of the route contained in a route memory of said route computer to be indicated on said vehicle display.

7. Control device according to claim 1, wherein in both first and second plugged-in positions, said switching means automatically causes a request indication for entering a route to appear on the vehicle display if no route has yet been stored in the route computer.

8. Control device according to claim 1, wherein said switching means are contacts or sensors which interface with corresponding contacts or sensors in the on-board section.

9. Control device according to claim 1, wherein in the first plugged-in position said switching means automatically transfers current data from the on-board section to said control device.

10. Control device according to claim 1, including an interface plug which makes contact with an interface coupling of said on-board section when said control device is plugged into a plug-in compartment of said vehicle in said first or secodn plugged-in position.

11. Control device according to claim 1, wherein in the first plugged-in position, said control device display is no longer visible.

12. Control device according to claim 1, further including a power supply connected to said integrated route computer means.

13. Control device according to claim 1, wherein said control device receives its power from an on-board power supply system of the vehicle when an interface connection has been established.

14. Control device according to claim 1, further including an accessible memory chip compartment into which road-network memory chips can be inserted and connected to said route computer means.

15. Control device according to claim 1, wherein the control device display is a 1-line LC display and the vehicle-installed display is a 2-line transflective LC display.

16. Control device according to claim 1, wherein said control device is formed as a rectangular-shaped box, with said first operating means on a top face of said box, and said control device display is in front of said first operating means in a plug-in direction.

17. Control device according to claim 1, wherein the first operating means is a key panel for inputting operation commands preceding the start of the trip, said key panel having multifunction keys.

18. Control device according to claim 1, wherein said integrated route computer means includes a central processing unit which controls said on-board section when said control device is connected to said vehicle.

* * * * *